United States Patent [19]
Yuan et al.

[11] Patent Number: 5,112,012
[45] Date of Patent: May 12, 1992

[54] TILTING MOMENTUM WHEEL FOR SPACECRAFT

[76] Inventors: Mark S. Yuan, 18341 Mt. Waterman St., Fountain Valley, Calif. 92708; Alois Wittmann, 29017 Geronimo Dr., Palos Verdes, Calif. 90274

[21] Appl. No.: 427,675

[22] Filed: Oct. 26, 1989

[51] Int. Cl.[5] .................................. B64G 1/28
[52] U.S. Cl. .................... 244/165; 248/178; 74/479; 74/89.15
[58] Field of Search .............. 244/165, 79; 114/122; 74/89.15, 479, 572, 5.4; 248/179, 188.2, 188.5; 403/123, 144, 51

[56] References Cited

U.S. PATENT DOCUMENTS

| | | | |
|---|---|---|---|
| 2,126,389 | 8/1938 | Hufferd | 403/123 |
| 2,431,439 | 11/1947 | Williams | 403/51 |
| 3,166,333 | 1/1965 | Henley | 403/144 |
| 3,264,880 | 8/1966 | Fischel et al. | 74/5 F |
| 3,329,375 | 7/1967 | Kurzhals et al. | 244/165 |
| 3,471,105 | 10/1969 | Yarber et al. | 244/165 |
| 3,813,067 | 5/1974 | Mork | 244/165 |
| 4,707,992 | 11/1987 | Holm | 60/721 |
| 4,919,844 | 4/1990 | Forman | 74/89.15 |

FOREIGN PATENT DOCUMENTS 2252629 6/1975 France.

*Primary Examiner*—Joseph F. Peters, Jr.
*Assistant Examiner*—Anne E. Bidwell

[57] ABSTRACT

A momentum wheel (14, 142) for compensating for the adverse effects of disturbing torques on stabilized spacecraft is mounted on a base (12, 124) on the spacecraft by three circumferentially spaced supports which include at least two linear actuators (26, 118) that tilt the wheel (14, 142) in any desired direction. One end of each actuator (26) is mounted to a base (38, 154) supporting the wheel by a spherical connection (32, 34, 36) which allows freedom of motion about multiple axes. The other end of each actuator (26) is mounted to the base (12) by either a pair of spaced hinges (22, 24, 46) and a support bracket (18) which is secured to the actuator (26) or a flexible bracket (78). The wheel base (12,124) may also be mounted on the actuators by flexible members (150) which allow tilting of the wheel.

21 Claims, 9 Drawing Sheets

TILTING MOMENTUM WHEEL FOR SPACECRAFT

TECHNICAL FIELD

The present invention broadly relates to device for compensating for the effects of disturbing torques on spacecraft or the like, especially spacecrafts which are stabilized about multiple axes. More particularly, the invention deals with an apparatus for mounting a momentum wheel so that the rotational axis of the wheel can be easily tilted to compensate for the disturbing torques.

BACKGROUND ART

It is well known to use momentum wheels in order to compensate for the periodic disturbing torques which act on stabilized spacecraft, particularly geostationary communication satellites. The momentum wheel is mounted on the spacecraft for rotation about an axis that is selectively oriented relative to the axes of the spacecraft, commonly orthogonal to the plane of the spacecraft's orbit.

In order to achieve active control about the axis orthogonal to the orbit plane, the speed of the momentum wheel is simply increased or decreased, the angular momentum of the wheel being sufficient to compensate for effects of disturbing torques on the spacecraft. In order to achieve active control about axes in the orbit plane or to compensate for effects of disturbing torques about such axes, the momentum wheel axis orientation must be altered.

In the past, momentum wheels of the type described above have been mounted on the spacecraft by means of a double gimbal system similar to those long used to mount compasses and the like, which employ redundancy in the drive mechanisms on each axis. This mounting arrangement is less than completely satisfactory for several reasons. The prior gimbals were relatively complex in design, were heavier than desired (an important factor in spacecraft) and were subject to reliability problems. In the event that any portion of one of the gimbals failed, the entire momentum wheel system were rendered inoperable.

Another type of tilting momentum wheel known in the art is described in a publication entitled "CMG's and Momentum Wheels," Revision 3, Publication No. 61-7223-00-03, published by Sperry Flight Systems. The momentum tilt wheel described in this publication is capable of providing three-axis attitude control and includes two linear gimbal actuators positioned around the periphery of the momentum wheel and a single center spherical ball bearing pivot which suspends the wheel. Spherical pivots are provided on each end of the actuators and thus act as hinge points at the vehicle interface and the interface with the housing which surrounds the wheel. This type of momentum wheel also suffers from a number of disadvantages, including the fact that the wheel cannot be properly positioned in the event that either of the linear actuators malfunctions.

SUMMARY OF THE INVENTION

The present invention is intended to overcome each of the deficiencies mentioned above inherent in the prior art.

According to the present invention, apparatus is provided for compensating for the disturbing torques acting on a stabilized spacecraft, or the like. Momentum wheel means, including a momentum wheel rotatable about an axis of rotation, applies a torque to the spacecraft in order to compensate for the adverse affects of disturbing torques. Means are provided for mounting the momentum wheel on the spacecraft, which, in one embodiment, include three independently operable, linear actuators mounted between the momentum wheel and the spacecraft. One end of each of the actuators is connected to a housing enclosing the momentum wheel by a spherical connector joint which allows freedom of movement about multiple axes of the housing relative to the actuator. The other end of each of the actuators is connected to the spacecraft by means of either a pair of hinges carried by a support bracket which is secured to the actuator or a flexible bracket. The actuators are evenly circumferentially spaced around the periphery of the momentum wheel and have their axes parallel to the spin axis of the wheel when the spin is oriented so as to be orthogonal relative to the spacecraft's orbit plane. By extending or retracting any two of the actuators, the momentum wheel can be tilted to any direction desired. Another embodiment of the invention employs a plurality of screw mechanisms for tilting the momentum wheel, in which the momentum wheel assembly is connected by flexible elements to spherical nut and sprocket members displaced by motor-driven screws. A central releasable support secures the momentum wheel in a fixed position during launching of the spacecraft to avoid damage to the actuator mechanisms and is released after launching by means of a pyrotechnic device.

It is therefore a primary object of the present invention to provide a tilting momentum wheel for spacecraft which is especially simple in construction and reliable.

Another object of the invention is to provide a mounting arrangement for a tilting momentum wheel as described above, whose accuracy is not highly dependent upon manufacturing tolerances or installation alignment.

A still further object of the present invention is to provide a mounting arrangement for a tilting momentum wheel as described above which permits tilting of the wheel in any direction.

A further object of the invention is to provide a mounting arrangement as described above which employs three separate actuators to assure nominal operation of the wheel in the event that one of the actuators fails.

Another object of the invention is to provide a mounting arrangement as described above, which is locked in a fixed position during launching of the spacecraft but is releasable to its operating position after the launch.

These, and further objects and features of the invention will be made clear or will become apparent during the course of the following description of a preferred embodiment of the invention.

DESCRIPTION OF THE PREFERRED EMBODIMENTS

Figure 1:
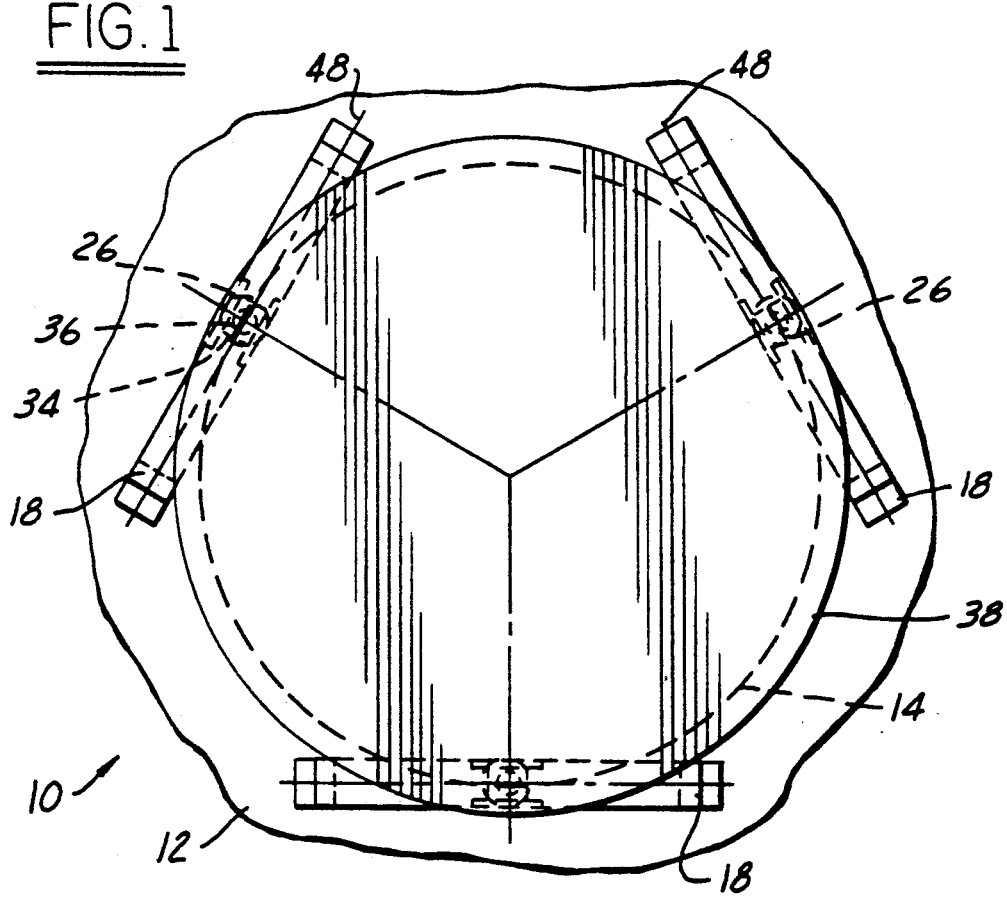
FIG. 1 is a plan view of a tilting momentum wheel for spacecraft which forms one embodiment of the present invention.

Referring first to FIGS. 1-4, the present invention relates to a tilting momentum wheel system 10 intended to be mounted on a base 12 carried by a spacecraft (not shown) in order to compensate for the effects of disturbing torques applied to the spacecraft, and thereby maintain its stability with reference to preselected axes. The system 10 includes a momentum wheel 14 which is rotatable about an axis of rotation 30. The details of the wheel 14 and the means for rotating it are well-known in the art, and therefore need not be discussed herein. A cylindrical housing 38 encloses the wheel 14 and may also contain portions of the wheel drive mechanism.

The combination of the momentum wheel 14 and housing 38 are mounted on the base 12 by three extensible support assemblies 16 which are essentially evenly circumferentially spaced around the perimeter of the wheel 14. Each of the support assemblies 16 includes a linear actuator or motor member 26 which is preferably electrically operated. Each actuator 26 includes a linearly displaceable output rod 28 whose axis extends parallel to the rotational axis 30, when the wheel 14 is in its normal position shown in FIG. 2. The outer end of the rod 28 is coupled by a socket and ball 34 and 36 respectively to a pair of ears 32 secured to the bottom side to the housing 38. In the illustrated embodiment, the socket 34 is secured as by welding to the ears 32, and the ball 36 is secured to the outer end of the rod 28. The socket and ball 34, 36 thus provide a spherical connection which allows freedom of movement of the housing 38 and wheel 14 relative to the actuator 26 about multiple axes.

A plurality of generally triangular support brackets 18 are respectively secured to the linear actuators 26 and each include triangular portions extending in opposite lateral directions from the corresponding actuator 26. The outer ends of the brackets 18 include downwardly extending finger portions 46 which are received within a pair of upstanding hinge brackets 22. Hinge pins 24 extend through the brackets 22 and finger portions 46 to form the pivotal connections, with the pivotal axis 48 of these connections extending perpendicular to the axis of the corresponding actuator rod 28. Also, when the wheel 14 is in its normal position, as shown in FIG. 2, the hinge axes 48 are essentially tangential to a reference circle which extends through the centers of the spherical bearings defined by the sockets 34 and balls 36.

The linear actuators 26 are connected by electrical lines to a suitable control system 50, the details of which are also well known in the art and need not be described in detail herein.

Figure 2:
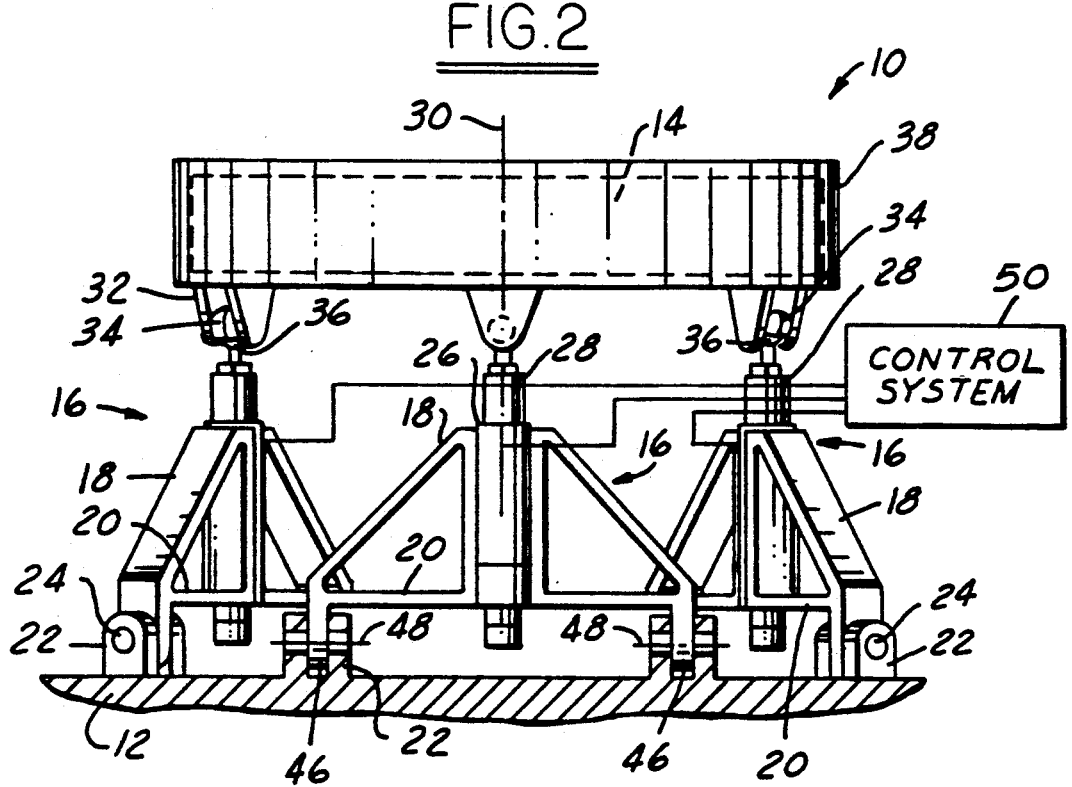
FIG. 2 is an elevational view of the tilting momentum wheel shown in FIG. 1, with the wheel shown in its normal position with the spin axis of the wheel orthogonal to the reference tilt plane.
Figure 3:
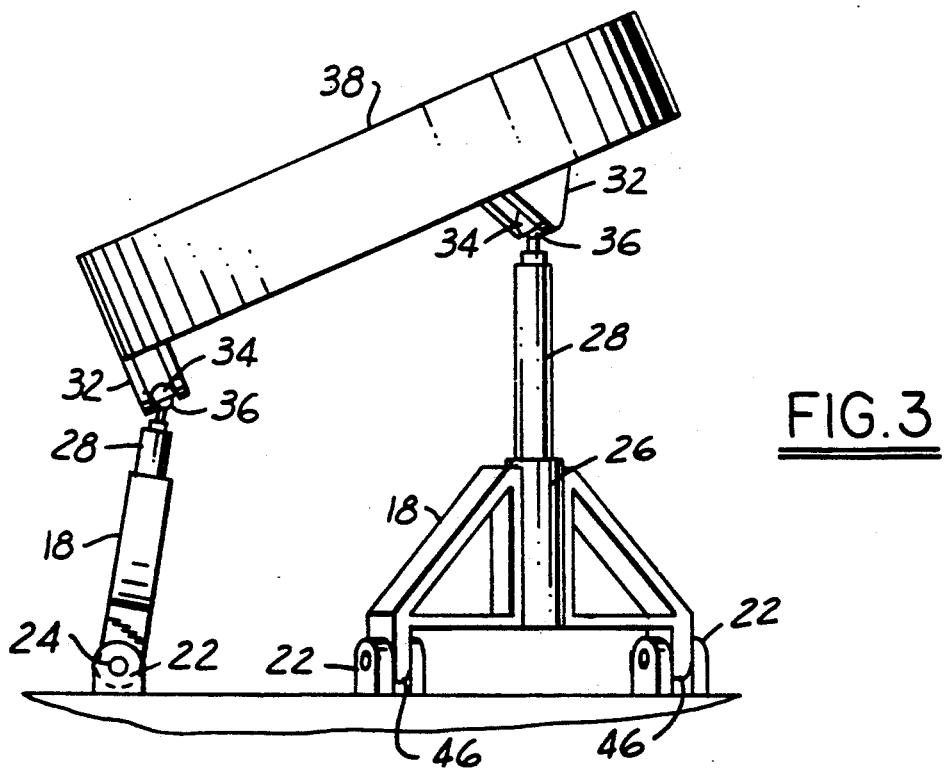
FIG. 3 is an elevational view of the tilting momentum wheel similar to FIG. 2 but taken from a different side and showing the wheel in a tilted position.
Figure 4:
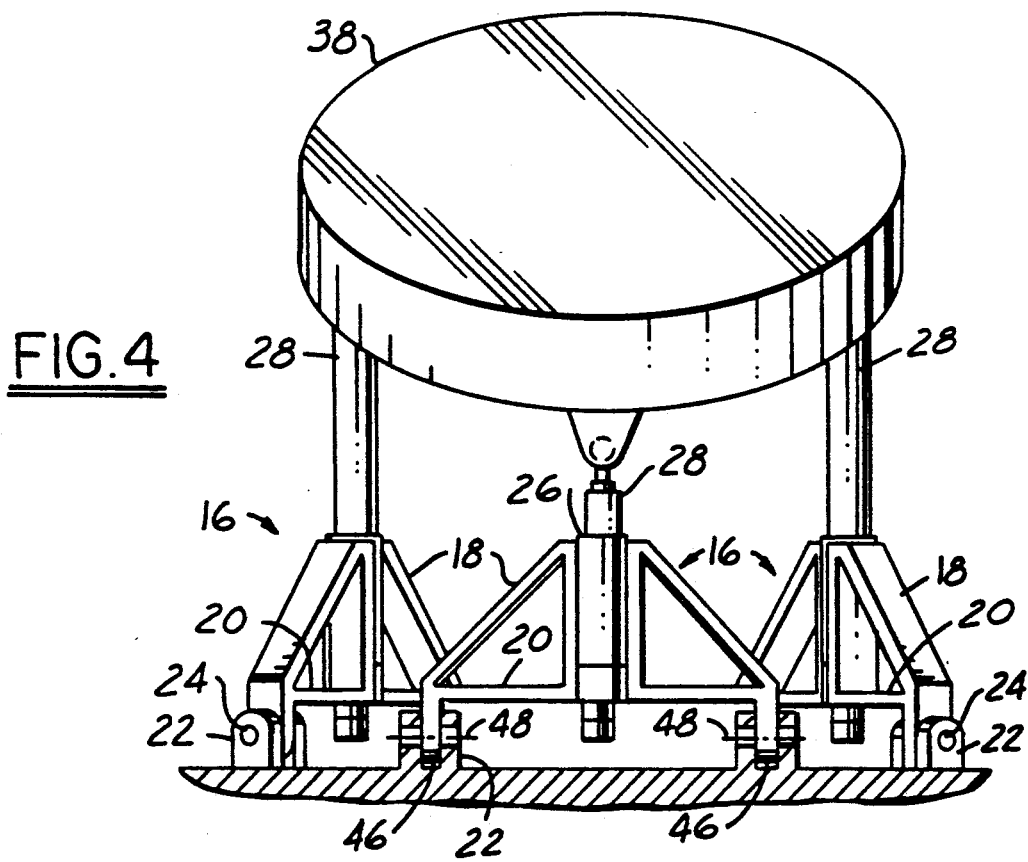
FIG. 4 is an elevational view similar to FIG. 3 but taken from a different side.

With the wheel 14 in its nominal position as depicted in FIG. 2, active compensation for disturbing torques about an axis orthogonal to the orbit plane of the spacecraft can be effected merely by increasing or decreasing the rotational speed of the wheel 14. In order to effect active compensation with respect to other axes in the orbit plane, the control system 50 produces control signals for individually actuating the linear actuators 26, causing tilting of the momentum wheel in the desired direction and at the desired inclination, as shown for example in FIGS. 3 and 4. As can be appreciated from FIGS. 3 and 4, when any one or more of the actuators 26 is actuated to extend a drive rod 28 so as to tilt the wheel 14, the actuators 26 along with their supporting brackets 18 are likewise allowed to tilt because of the spherical and pivotal connections described above. It can also be appreciated that by extending or retracting any two of the linear actuators 26, the wheel 14 can be tilted to any desired direction. Also, importantly, since the actuators can be extended or retracted, in the event that one of the actuators 26 fails, the remaining two actuators may nevertheless be employed to effect tilting of the wheel, thus providing the system with "redundancy" to improve its reliability.

Figure 5:
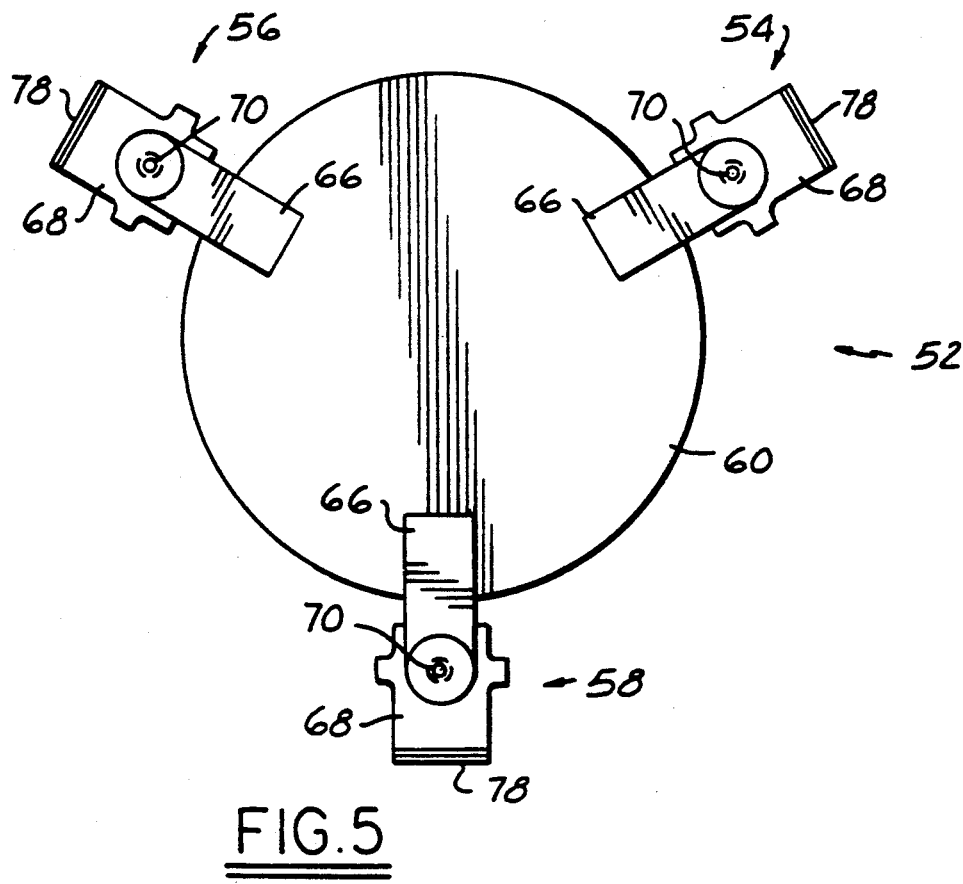
FIG. 5 is a plan view of another embodiment of the present invention employing a flexure bracket in place of the hinged bracket depicted in FIGS. 1-4.
Figure 6:
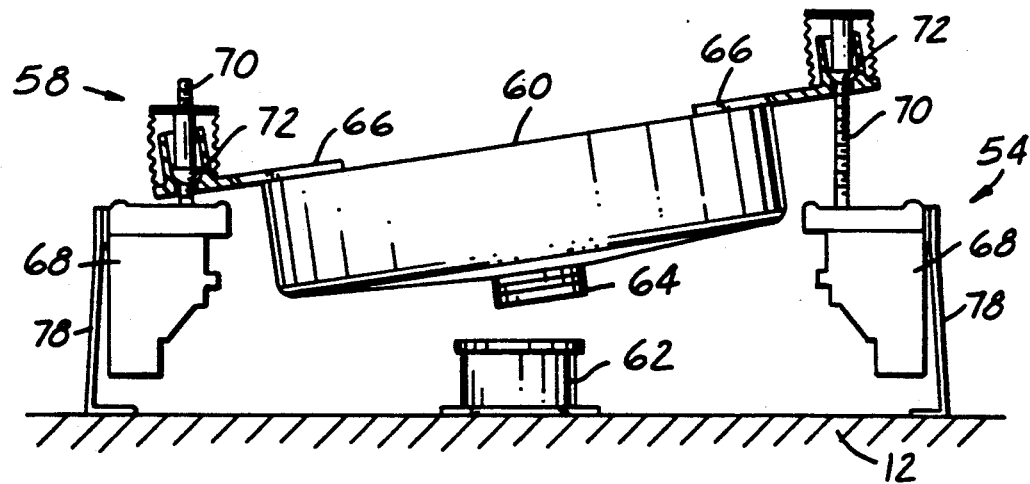
FIG. 6 is an elevational view of the tilting momentum wheel shown in FIG. 5, depicted in its operative tilted position, with the actuators thereof being rotated into the plane of the paper.
Figure 7:
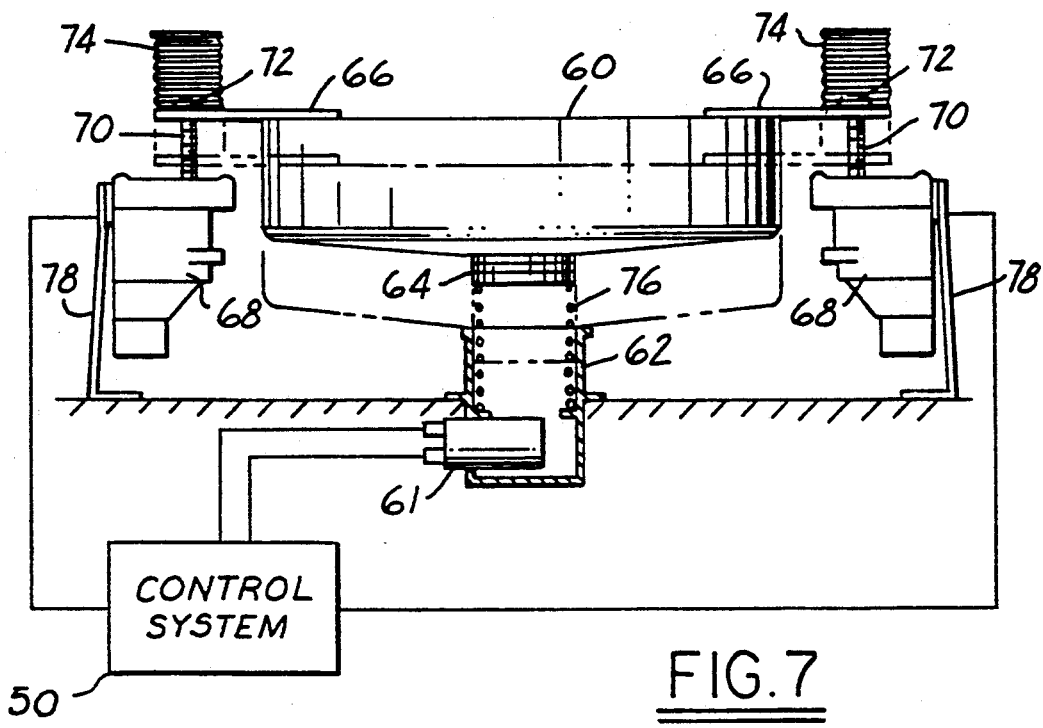
FIG. 7 is a view similar to FIG. 6 showing the tilting momentum wheel in a non-tilted, released position but also depicting, in phantom, the wheel in its locked, retracted position during launch, with the actuators thereof rotated into the plane of the paper.

Attention is now directed to FIGS. 5-7 which depict an alternate form of the tilting momentum wheel of the present invention. The alternate embodiment 52 includes a cylindrically shaped housing 60 which encloses the tilting momentum wheel (not shown) and three linear drive-type tilting mechanisms 54–58, respectively. The tilting mechanisms 54–58 support the housing 60 on a base 12 of the spacecraft and are equally, circumferentially spaced around the periphery of the housing 60.

Each of the tilting mechanisms 54–58 includes a jack screw-type actuator 68 which is secured to the base 12 of the spacecraft by means of a laterally flexible support bracket 78. Each of the jack screw actuators 68 includes a jack screw 70 powered by a suitable mechanism well known in the art which may be of an electrical or hydraulic type. A spherically shaped nut 72 is captured within a laterally extending bracket 66 that is secured to the housing 60. The spherical nut 72 threadably receives the jack screw 70, and by virtue of the freedom of movement of the spherical nut 72 within the bracket 66, the bracket 66 and thus the housing 60 may tilt relative to the longitudinal axes of the jack screws 70. The use of the L-shaped flexible brackets 78 of course eliminates the need for a second set of bearings for mounting the tilting mechanisms 58 on the base 12, and thus eliminates the possibility of backlash in such bearings. As in the case of the embodiment shown in FIGS. 1–4, the tilting mechanisms 54–58 are controlled by a suitable control systems 50.

Figure 7A:
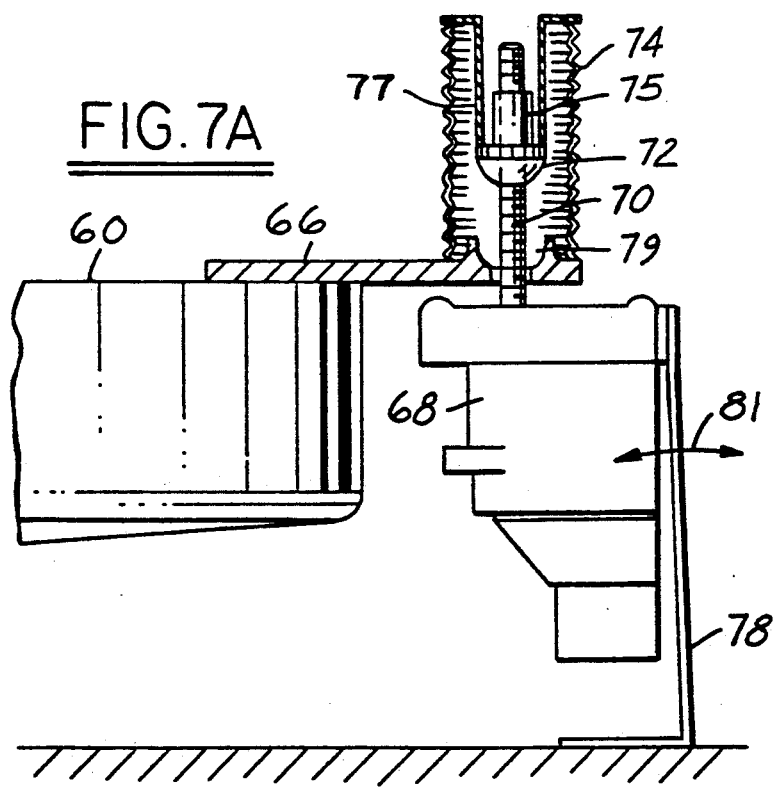
FIG. 7A is an enlarged view of a portion of the arrangement for mounting the support means on the momentum wheel means.

The details of one of the actuators 68 and related mounting mechanism are depicted, on an enlarged scale, in FIG. 7A. The bracket 66 is provided with an upwardly extending cylindrical portion 77 which forms a guide for the movement of the spherical nut 72 and includes a cupped-shaped portion 79 at the bottom thereof. A bellows spring 74 urges a sleeve 75 to bear downwardly against the spherical nut 72 which in turn urges the nut 72 into the cupped portion 79 when the momentum wheel is in its released, unlocked position after launching. The bellows spring effectively prevents the nut 72 from turning as the jack screw 70 turns about its axis and also acts to prevent backlash in the mechanism. In FIG. 7A, the mounting arrangement is shown in its prelaunched, locked and retracted position. Upon launching, the housing 60 is allowed to move upwardly, and the bellows spring 74 urges the nut 72 down into a seated position in the cupped portion 79. Also shown in FIG. 7A is the lateral direction of motion, indicated by the numeral 81 of the flexible bracket 78 and thus that of the actuator 68.

The spherical nuts 72 of course act as pivotal seats, thereby simplifying the design of the assembly and ensure moment-free attachment of the housing or platform 60 to the spacecraft; this is vital to assure pure, in-line loading of the jack screws when the momentum wheel is supported on the flexible brackets 78 during launch of the spacecraft. The three-point support of the momentum wheel and its housing 60 on the three flexible brackets 78 assures a structurally determinant arrangement which is free of assembly stress.

In order to protect the jack screw actuators 68 against damage during launch of the spacecraft, a single locking mechanism located at the central axis of the wheel is provided which consists of a first annular flange portion 64 mounted on the bottom of the housing 60, which is received within a cylindrical casing 62, that is in turn secured to the platform 12. An axially arranged compression spring 76 within the casing 62 bears against the flange 64. The flange 64 is normally locked within the casing 76 during launch of the spacecraft so that the momentum wheel and housing 60 are effectively rigidly fixed to the spacecraft platform during launch. After launch, a conventional pyrotechnic device 61 operated by the control system 50 releases a pyrotechnic charge which unlocks the flange 64. Upon release of the housing 60, the spring 76 urges the momentum wheel and housing 60 upwardly so that the spherical nuts 72 become properly seated within the cupped-shaped seat 79. Following launching, the compression spring 76 provides an equal preload on all three of the tilting mechanisms 54–56 to allow backlash-free operation thereof.

From the foregoing, it can be appreciated that the momentum wheel support arrangements described above are statically determinate (i.e., non-binding), by virtue of the use of either hinged brackets 18 and ball and socket connection (FIGS. 1–4) or the flexible brackets 78 and spherical connectors 72 (FIGS. 5–7).

Figure 8:
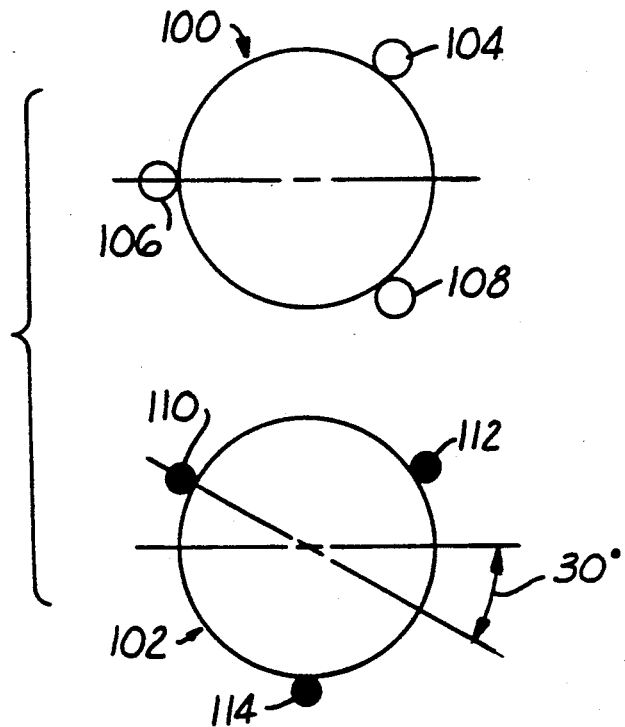
FIG. 8 is a diagrammatic, plan view of a pair of tilting momentum wheels according to the present invention employed on a single spacecraft for redundancy.
Figure 9:
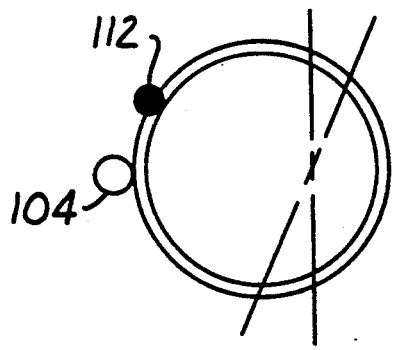
FIG. 9 is a diagrammatic, plan view representing the combined operation of the momentum wheels shown in FIG. 8 with all but one tilting mechanism for each wheel being rendered inoperable.

In some applications, it may be desirable to provide a pair of the tilting momentum wheels described above for use on a single spacecraft in order to achieve redundancy. In this connection, attention is now directed to FIG. 8 which depicts a pair of tilting momentum wheels 100, 102 of the type previously described which form the preferred embodiments of the present invention. The wheels 100, 102 are oriented about their central axes 30 degrees relative to each other on the spacecraft to provide complete momentum vector control, even if four of the six tilting mechanisms 104–114 fail in operation. For example, in the event that tilting mechanisms 106–108 and 110, 114 fail, thus leaving mechanisms 104 and 112 in operation, equivalent momentum control is provided by the two remaining operable mechanisms 104, 112, as indicated in the equivalent diagrammatic view shown in FIG. 9.

It should be noted at this point that various features of the two above-described embodiments of the invention can be advantageously combined to achieve the objectives of the invention. For example, an alternate version of implementing the present invention might, for example, include a pair of the support assemblies 16 of the type shown in FIGS. 1–4, with a single one of the tilting mechanisms 58, including a flexible bracket 78, of the type shown in FIGS. 5–7A. In this latter-mentioned version of the invention, the jack screw assembly may be deleted from the tilting assembly 58 so that tilting is entirely controlled by the support assemblies 16, with the tilting assembly 58 only providing flexing of the pivot point between the bracket 78 and the connection with the momentum tilt wheel.

A still further embodiment of the invention will now be described with reference to FIGS. 10–19. A base 124 has secured thereto, equidistant around its periphery, three tilting mechanisms 118 for selectively tilting a momentum wheel 142, indicated in phantom and shown in two different positions of tilt in FIG. 11. Each of the tilting assemblies 118 includes a jack screw comprising a stepper motor 120 which rotates a threaded screw shaft 122. A threaded spherical nut member 126 is threadably mounted on the screw shaft 122 and is displaced along the longitudinal axis of the shaft 122 upon rotation of the latter, in a manner similar to the embodiment previously described in connection with FIGS. 5–7A. A spherical socket member 127 is mounted on the nut member 126.

A pair of laterally spaced flexible members 150 each have one end thereof secured as by bolts 152 to the socket member 127. The flexible members 150 extend upwardly and have their upper ends secured to a platform 154, also by bolts 152. The flexible members 150 perform a function similar to the flexible brackets 78 previously described in connection with FIGS. 5-7A, and may be manufactured of any suitable stiff but bendable material such as spring steel or appropriate reinforced synthetic material. The momentum wheel 142 in turn is secured to the platform 154 by suitable means, such as bolts, so that the wheel 142 and platform 154 tilt as a single unit.

Figure 18A:
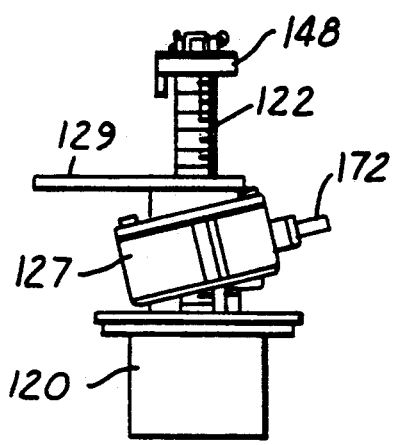
FIGS. 18A and 18B are elevational views showing the tilting action of the spherical socket member.
Figure 18B:
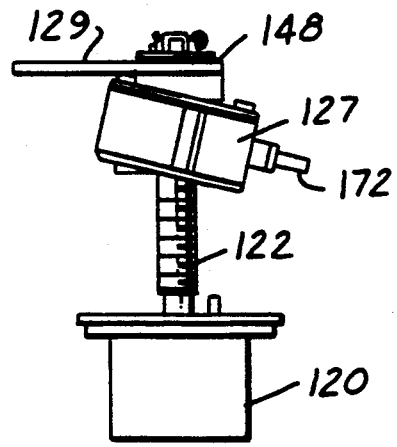
Figure 19:
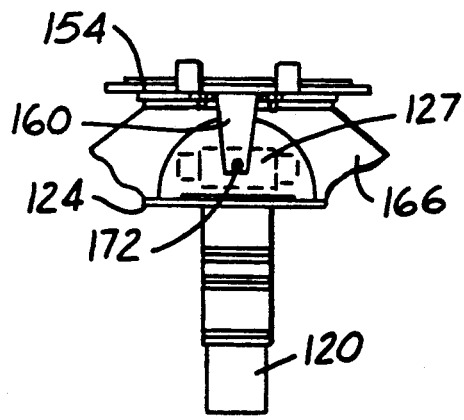
FIG. 19 is an elevational view depicting the details of the anti-rotation arrangement, the potentiometer and jack screw assembly having been deleted for purposes of clarity.

An upstanding support 166 is secured to the base 124 and provides a surface against which the platform 154 may rest, when the momentum wheel is in its prelaunch, locked position. Anti-rotation brackets 160 are secured to the bottom side of the platform 154 and extend downwardly therefrom. Each of the brackets 160 includes a slot at its lower end for receiving a stub shaft 172 which extends laterally from and is secured to the corresponding socket member 127. The other end of the stub shaft 172 extends into a groove 171 of the nut member 126. This arrangement prevents undesired rotation of the socket member 127 and the nut member 126 relative to the base 124. As shown in FIGS. 18A and 18B, the socket member 127 is mounted on the nut member 126 so as to pivot about an axis transverse to the screw shaft 122 in response to tilting movement of the wheel 142.

A linear potentiometer 130 is secured to the base 124 and includes an upwardly extending, slidable shaft 128. The upper end of the shaft 128 is coupled by means of a bracket 129 to the nut member 126 so that displacement of the nut member 126 likewise displaces the shaft 128, thus causing the potentiometer 130 to produce a signal related to the tilting displacement of the wheel 142 by the corresponding jack screw assembly.

Figure 11:
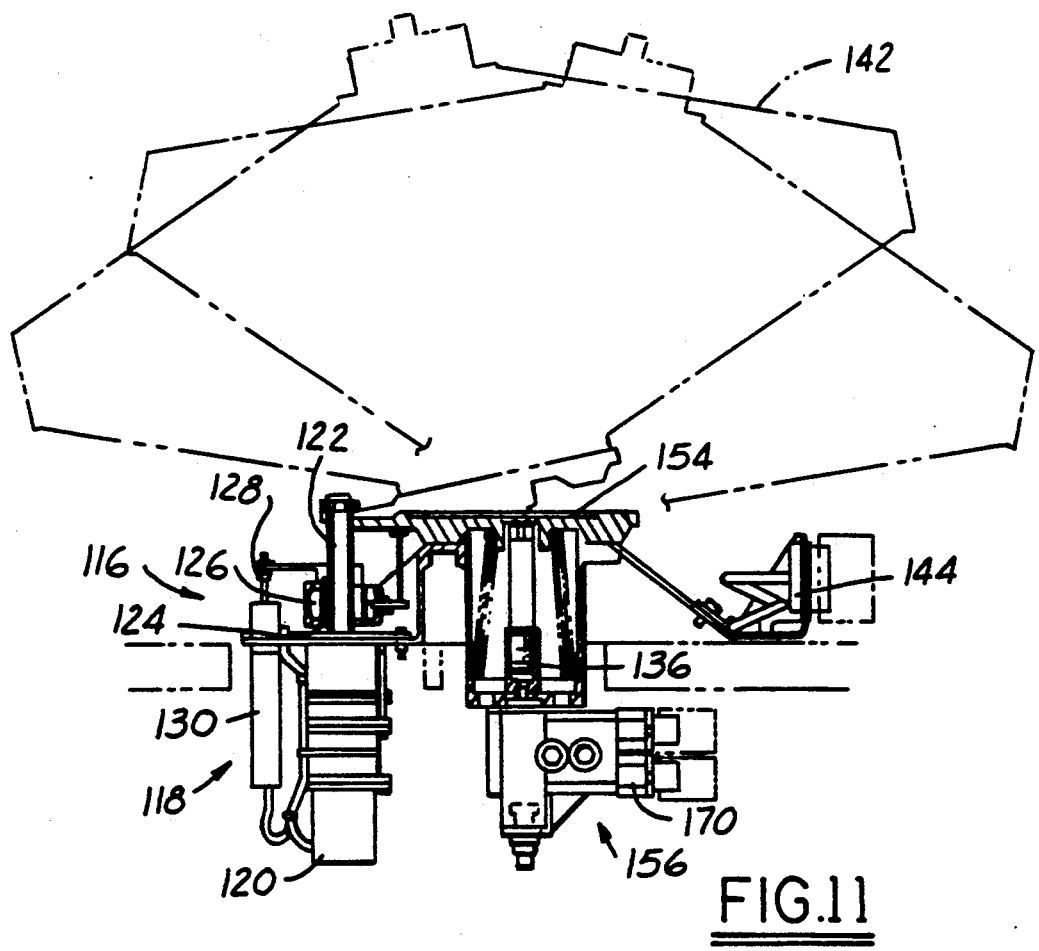
FIG. 11 is a sectional view taken along the line 11—11 in FIG. 10 and showing, in phantom, the momentum wheel in two alternate positions of tilting.
Figure 12:
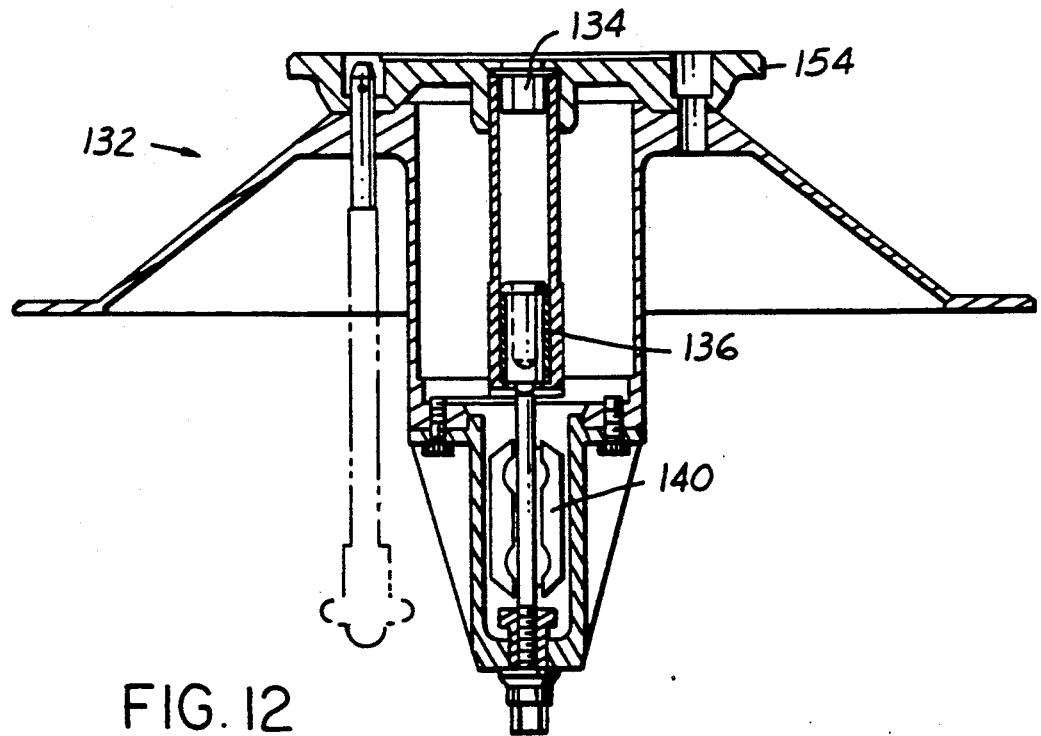
FIG. 12 is a sectional view taken along the line 12—12 in FIG. 10, with certain parts not shown in order to more clearly depict the details of the locking and release mechanism.
Figure 13:
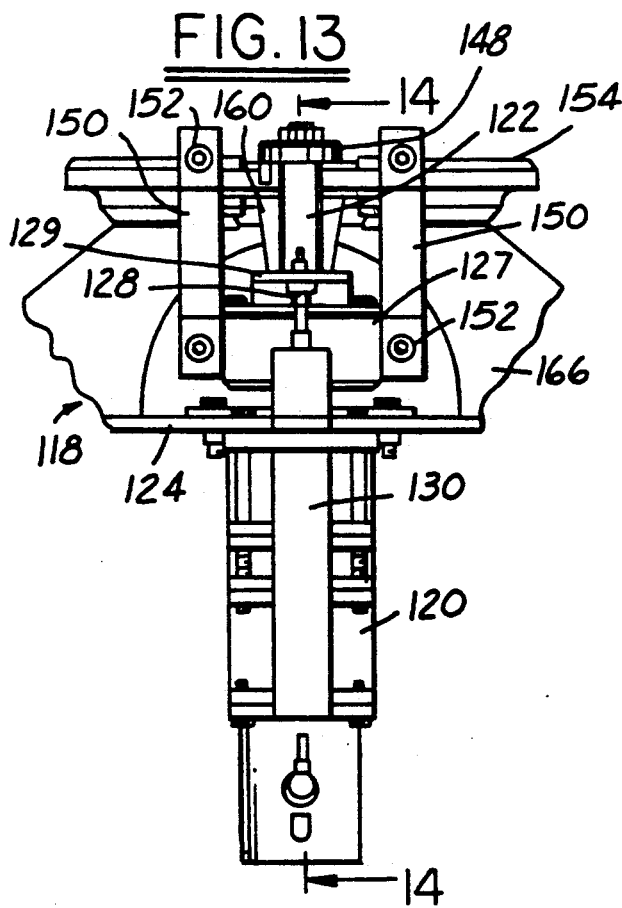
FIG. 13 is a side view of one of the drive assemblies, parts being broken away for purposes of clarity.
Figure 14:
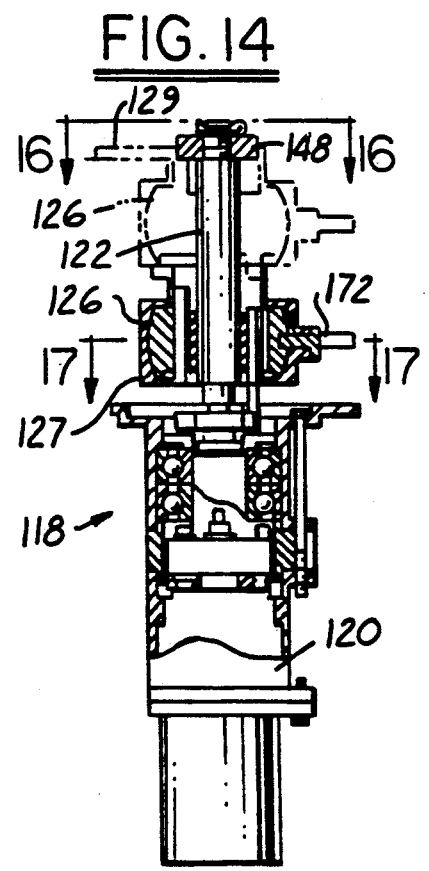
FIG. 14 is a sectional view taken along the line 14—14 in FIG. 13, certain portions being deleted for sake of clarity.
Figure 15:
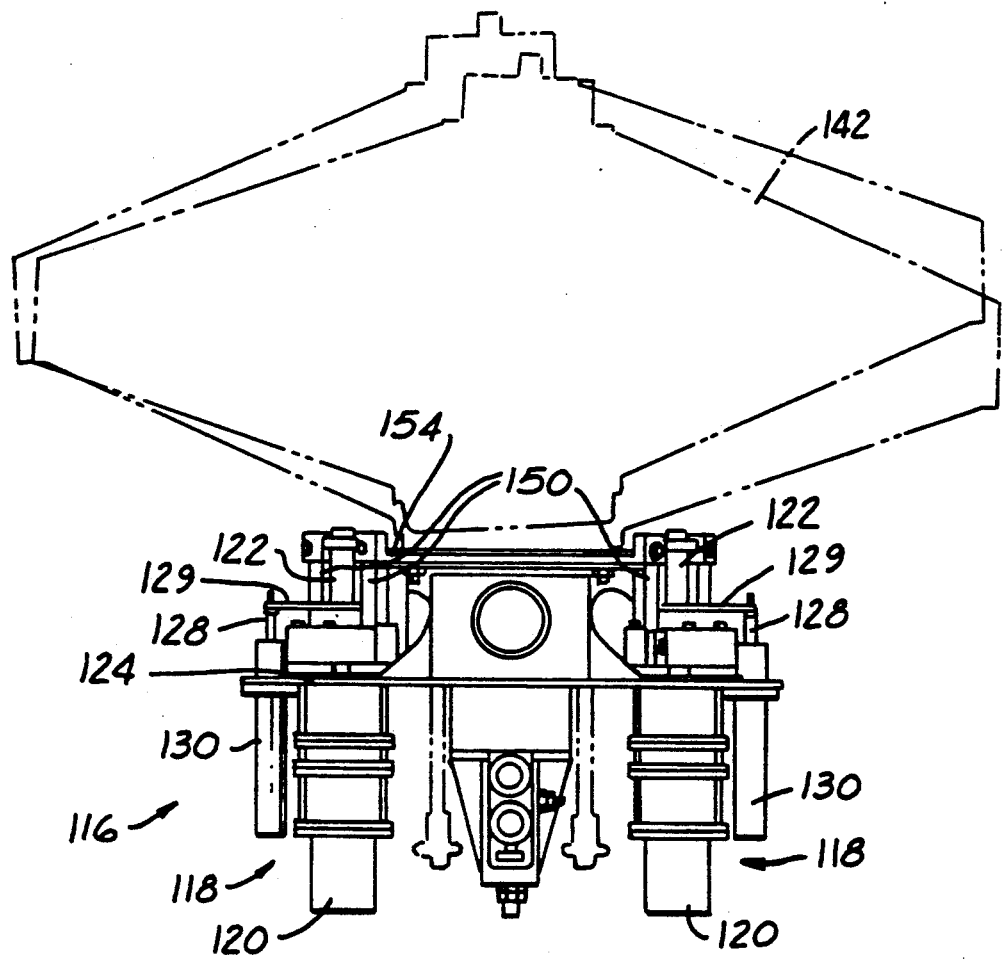
FIG. 15 is a view taken along the line 15—15 in FIG. 10.
Figure 17:
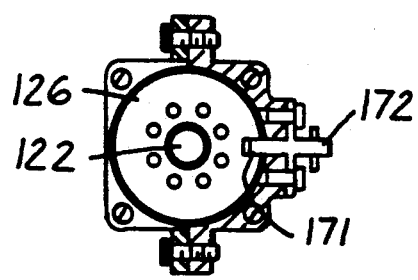
FIG. 17 is a sectional view taken along the line 17—17 in FIG. 14.
Figure 16:
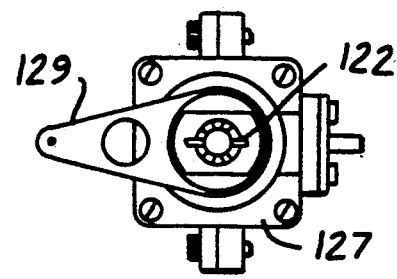
FIG. 16 is a view taken along the line 16—16 in FIG. 14.

The presently described embodiment includes means generally indicated at 156 in FIG. 11 for locking the momentum wheel 142 prior to and during launch, similar to that previously described with references to FIGS. 5-7A. The locking means 156 includes a pressure cartridge 170 adapted to operate on a bolt cutter 140, which results in the release of a spring 136 that cooperates with a crushable assembly 134 to release and displace upwardly the momentum wheel 142.

Figure 10:
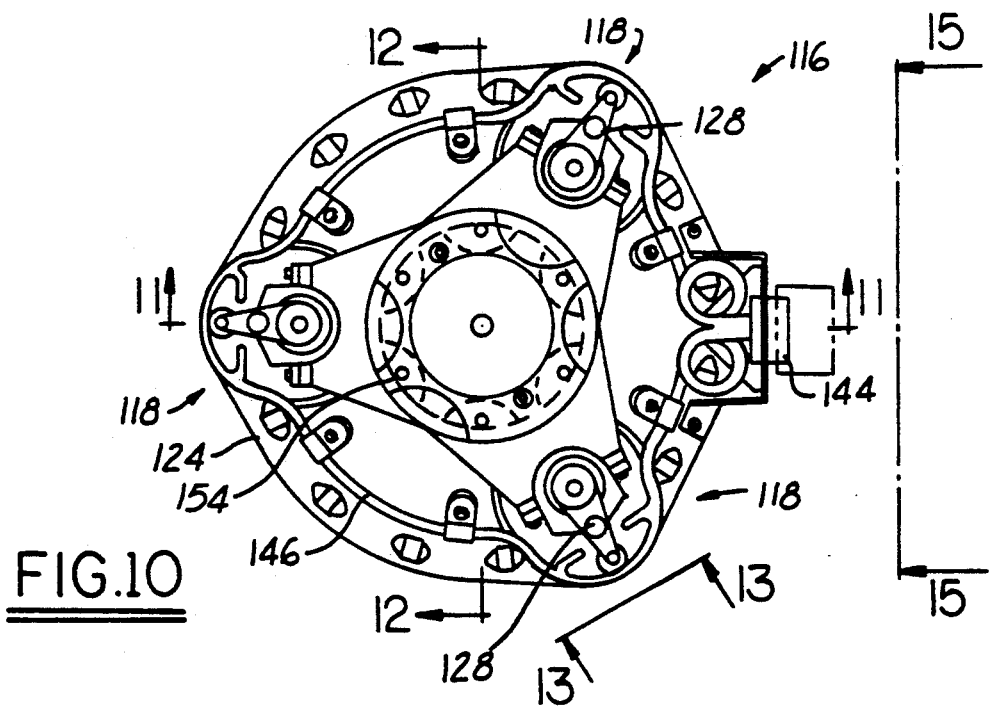
FIG. 10 is a top plan view of a tilting momentum wheel which forms the preferred embodiment of the present invention.

As best seen in FIG. 10, an electrical connector 144 and electrical lines 146 are employed to electrically connect the stepper motors 120 and potentiometers 130 with a suitable control system (not shown).

From the foregoing, it can be appreciated that the tilting momentum wheel described above not only provides for the reliable accomplishment of the objects of the invention, but does so in a particularly effective and economical manner. It is recognized, of course, that those skilled in the art may make various modifications or additions to the preferred embodiment chosen to illustrate the invention without departing from the spirit and scope of the present contribution to the art. It is also recognized that the essence of the invention can be employed for applications other than those specifically described herein, such as for mounting a directional antenna in a manner which allows tilting thereof so as to achieve either tilting or focusing the antenna beam. For example, all three of the linear actuators described above can be energized so as to displace the antenna either closer to or farther away from the target. Accordingly, it is to be understood that the protection sought and to be afforded hereby should be deemed to extend to the subject matter claimed and all equivalents thereof fairly within the scope of the invention.

What is claimed is:

1. Apparatus for compensating for disturbing torques acting on a stabilized spacecraft or the like, comprising:

momentum wheel means including a momentum wheel rotatable about an axis for applying a torque to said spacecraft to compensate for said disturbing torques;

means for mounting said momentum wheel means on a base carried by said spacecraft, said mounting means including (A) three support means circumferentially spaced around said momentum wheel means, at least two of said support means including an extensible member operable for displacing said momentum wheel means in a manner to change the orientation of said rotation, and (B) means for connecting each of said support means between said momentum wheel means and said base at circumferentially spaced locations around said momentum wheel in a manner to allow tilting of said momentum wheel means relative to said base; and releasable locking means connected between said momentum wheel means and said base for protecting said connecting means from loads exceeding tilt movement loads.

2. The apparatus of claim 1, wherein said connecting means includes a pivotal connection between said base and each of said support means.

3. The apparatus of claim 2, wherein said connecting means includes a connection between said momentum wheel means and each of said support means allowing multiple degrees of movement of said support means relative to said momentum wheel means.

4. The apparatus of claim 3, wherein said wheel means includes a housing enclosing said momentum wheel and each of said connections between said momentum wheel means and said extensible members includes a portion secured to said housing.

5. The apparatus of claim 1, wherein the third one of said support means includes an extensible member.

6. The apparatus of claim 5, wherein said momentum wheel means is tiltable about two axes by the three extensible members.

7. The apparatus of claim 1, wherein each of said connecting means includes a flexible bracket carrying a corresponding one of said support means, said bracket flexing to permit tilting of said momentum wheel means upon actuation of at least one of said extensible members.

8. The apparatus of claim 1, wherein said releasable locking means includes an actuatable pyrotechnic device for releasing said momentum wheel means from a locked position to a released operating position.

9. The apparatus of claim 1, wherein each of said connecting means associated with said two support means includes a spherical nut drivingly coupled with a corresponding extensible member.

10. The apparatus of claim 9, wherein each of said associated connecting means includes a bracket secured to said momentum wheel means, said bracket including a guideway within which said spherical nut may travel between a standby, inoperative position and a normal operating position.

11. The apparatus of claim 10, wherein each of said associated connecting means includes means for urging the corresponding spherical nut towards its normal operating position.

12. The apparatus of claim 1 wherein said loads exceeding tilt movement loads including loads occurring during launch of said spacecraft.

13. Apparatus for tilting a platform, comprising:
three support means circumferentially spaced around a central point on said platform for supporting said platform on a base, at least two of said support means including an extensible motor member operable for displacing said platform in a manner to change the orientation of said device; and
means for connecting each of said support means between said platform and said base at circumferentially spaced locations around said point in a manner to allow tilting of said platform relative to said base; and
releasable locking means connected between said platform and said base for locking said platform against tilting movement.

14. The apparatus of claim 13, wherein said connecting means includes a pivotal connection between said base and each of said support means.

15. The apparatus of claim 14, wherein said connecting means includes a connection between said platform and each of said support means allowing multiple degrees of movement of said support means relative to said platform.

16. The apparatus of claim 13, wherein the third one of said support means includes an extensible motor member.

17. The apparatus of claim 16, wherein said platform is tiltable by the three motor members respectively about three axes.

18. The apparatus of claim 13, wherein each of said connecting means includes a flexible bracket carrying a corresponding one of said support means, said bracket flexing to permit tilting of said platform upon actuation of at least one of said motor members.

19. The apparatus of claim 13, wherein each of said connecting means associated with said two support means includes a spherical nut and a spherical socket drivingly coupled with a corresponding motor member.

20. The apparatus of claim 19, wherein each of said associated connecting means includes a bracket secured to said platform, said bracket including a guideway within which said spherical socket may travel between a standby, operative position and a normal operating position.

21. The apparatus of claim 20, wherein each of said associated connecting means includes means for urging the corresponding spherical nut toward its normal operating position.

* * * * *

UNITED STATES PATENT AND TRADEMARK OFFICE
CERTIFICATE OF CORRECTION

PATENT NO. : 5,112,012
DATED : May 12, 1992
INVENTOR(S) : Alois Wittmann

It is certified that error appears in the above-indentified patent and that said Letters Patent is hereby corrected as shown below:

On the Title page, item [76], delete Mark S. Yuan as an inventor--.

Signed and Sealed this

Seventh Day of September, 1993

Attest:

BRUCE LEHMAN

Attesting Officer

Commissioner of Patents and Trademarks